United States Patent [19]
Evans et al.

[11] 4,429,102
[45] Jan. 31, 1984

[54] NOVEL SULFUR-CONTAINING POLYETHERIMIDES

[75] Inventors: Thomas L. Evans; Marsha M. Grade, both of Schenectady, N.Y.

[73] Assignee: General Electric Company, Schenectady, N.Y.

[21] Appl. No.: 457,090

[22] Filed: Jan. 10, 1983

[51] Int. Cl.$^3$ .............................................. C08G 73/10
[52] U.S. Cl. ..................................... 528/172; 528/26; 528/125; 528/126; 528/128; 528/185; 528/188; 528/208
[58] Field of Search ................ 528/172, 26, 125, 126, 528/128, 185, 188, 208

[56] References Cited

U.S. PATENT DOCUMENTS

| | | | |
|---|---|---|---|
| 3,422,064 | 1/1969 | Gall | 260/47 |
| 3,847,867 | 11/1974 | Heath et al. | 528/172 |
| 3,983,093 | 9/1976 | Williams et al. | 260/47 |
| 4,048,142 | 9/1977 | Takeoshi | 528/172 |
| 4,281,100 | 7/1981 | Takekoshi | 528/172 |

*Primary Examiner*—Lester L. Lee
*Attorney, Agent, or Firm*—William H. Pittman; James C. Davis, Jr.; James Magee, Jr.

[57] ABSTRACT

Novel polyetherimides containing sulfone units such as those derived from bis(3,4-dicarboxyphenyl) sulfone dianhydride, as well as units derived from an ether anhydride such as 2,2-bis[4-(3,4-dicarboxyphenoxy)-phenyl]propane dianhydride, may be prepared by the reaction of a mixture of said dianhydrides with diamines such as m-phenylene diamine. The polyetherimides have high thermal stability and solvent resistance.

10 Claims, No Drawings

NOVEL SULFUR-CONTAINING POLYETHERIMIDES

This invention relates to new polymeric compositions of matter characterized by high thermal stability and solvent resistance. In its broadest sense, the invention is directed to polyetherimides consisting essentially of chemically combined units having the formulas

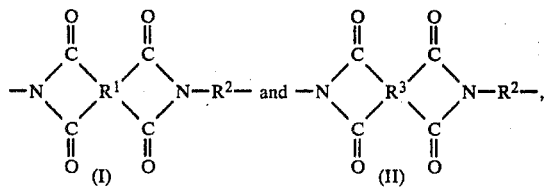

wherein:
$R^1$ is

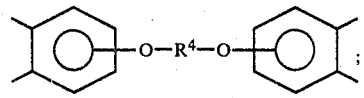

$R^2$ is a divalent hydrocarbon-based radical;
$R^3$ is

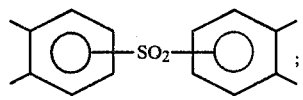

and
$R^4$ is a divalent aromatic hydrocarbon-based radical.

Polyetherimides, which may be prepared by the reaction of various diamines with aromatic bis-anhydrides, constitute a well known class of commercially available polymers having many desirable characteristics. Typical known polyetherimides may be prepared by the reaction of m-phenylenediamine with 2,2-bis[4-(3,4-dicarboxyphenoxy)phenyl]propane dianhydride. It is desirable, however, to produce polyetherimides having improved thermal stability and solvent resistance.

A principal object of the present invention, therefore, is to provide novel polyetherimides.

A further object is to provide polyetherimides of improved thermal stability and solvent resistance, as well as a method for their preparation.

Other objects will in part be obvious and in part appear hereinafter.

The polyetherimides of this invention are characterized by the presence within their molecular structure of chemically combined units having formulas I and II. The term "divalent hydrocarbon-based radical", as used in the definition of the polyetherimides, denotes a divalent radical free from ethylenic and acetylenic unsaturation, having a carbon atom directly attached to the remainder of the molecule and having predominantly hydrocarbon character within the context of this invention. Such radicals include the following:

(1) Hydrocarbon radicals; that is, aliphatic, alicyclic, aromatic, aliphatic- and alicyclic-substituted aromatic, aromatic-substituted aliphatic and alicylic radicals, and the like. Such radicals are known to those skilled in the art; examples are ethylene, propylene, trimethylene, octamethylene, cyclopentylene, cyclohexylene, phenylene, tolylene, xylylene, 1,4-naphthylene, 1-5-naphthylene, p,p'-biphenylene and 2,2-(p,p'-diphenylene)propane (all isomers being included).

(2) Substituted hydrocarbon radicals; that is, radicals containing non-hydrocarbon substituents which, in the context of this invention, do not alter the predominantly hydrocarbon character of the radical. Those skilled in the art will be aware of suitable substituents; examples are halo, alkoxy (especially lower alkoxy), carbalkoxy, nitro, cyano and alkyl sulfone.

(3) Hetero radicals; that is, radicals which, while predominantly hydrocarbon in character within the context of this invention, contain atoms other than carbon present in a chain or ring otherwise composed of carbon atoms. Suitable hetero atoms will be apparent to those skilled in the art and include, for example, nitrogen, oxygen, sulfur and silicon.

For the most part, not more than three substituents or hetero atoms will be present for each 10 carbon atoms in the hydrocarbon-based radical. An exception comprises molecules in which silicon is a hetero atom, which may, for example, contain three hetero atoms for as few as 4 carbon atoms.

Terms such as "divalent aromatic hydrocarbon-based radical" and the like have analogous meanings with respect to aromatic radicals and the like.

The radical $R^1$ in formula I has formula III, in which $R^4$ is a divalent aromatic hydrocarbon-based radical. $R^4$ is most often a divalent radical derived from benzene or a substituted benzene, biphenyl or a substituted biphenyl, or a diphenylalkane which may contain substituents on one or both aromatic radicals. The following radicals are preferred as $R^4$:

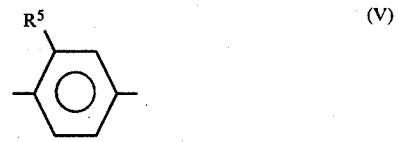

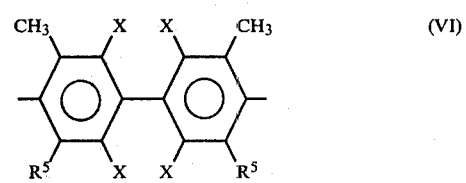

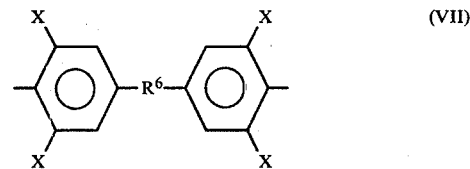

wherein each $R^5$ is independently hydrogen or methyl, $R^6$ is a straight-chain or branched alkylene radical containing 1–5 carbon atoms and is most often the isopropylidene radical, and each X is independently hydrogen or halogen (usually chlorine or bromine). Mixtures of the foregoing formulas are also contemplated. Especially preferred is the radical derived from bisphenol A [i.e., 2,2'-bis(4-hydroxyphenyl)propane] by the removal of both hydroxy groups therefrom, and having formula VII wherein $R^6$ is isopropylidene and each X is hydrogen.

R[2] in formulas I and II is most often an aromatic hydrocarbon radical containing about 6–20 carbon atoms or a halogenated derivative thereof, an alkylene or cycloalkylene radical containing about 2–20 carbon atoms, or a bis-alkylenepoly(dialkylsiloxane) radical. The aromatic hydrocarbon radicals are preferred.

The R[1-3] radicals of formulas I and II may be conveniently defined in terms of typical polyetherimide precursors, herein identified respectively as bis-anhydrides of the formulas

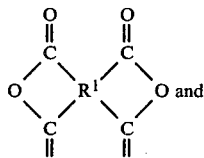

and

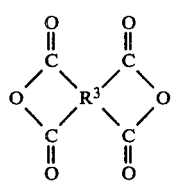

and diamines of the formula (X) $H_2N—R^2—NH_2$.

In formulas III and IV, the $O—R^4—O—$ and $—SO_2—$ moieties may be attached to the phthalic anhydride moieties in the 3-positions or, preferably, the 4-positions, or mixtures thereof. Thus, the preferred bis-anhydrides of formulas V and VI, respectively, for use according to this invention are 2,2-bis[4-(3,4-dicarboxyphenoxy)phenyl]propane dianhydride (hereinafter "bisphenyl A dianhydride") and bis(3,4-dicarboxyphenyl) sulfone dianhydride (hereinafter "sulfone dianhydride"). Sulfone dianhydride is a known compound disclosed, for example, in U.S. Pat. No. 3,422,064; it may be prepared by sulfonation of o-xylene to the corresponding sulfone followed by oxidation of the methyl groups.

Examples of suitable diamines of formula X are heptamethylenediamine, octamethylenediamine, 2,11-dodecanediamine, 1,12-octadecanediamine, 3-methylheptamethylenediamine, 4,4-dimethylheptamethylenediamine, 5-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl) sulfide, 1,4-cyclohexanediamine, bis-(4-aminocyclohexyl)methane, m-phenylenediamine, p-phenylenediamine, 2,4-diaminotoluene, 2,6-diaminotoluene, m-xylyenediamine, p-xylyenediamine, benzidine, 3,3'-dimethyl-benzidine, 3,3'-dimethoxybenzidine, 1,5-diaminonaphthalene, 4,4'-diaminodiphenylmethane, 4,4'-diaminodiphenylpropane, 2,4-bis-(β-amino-t-butyl)toluene, bis(p-β-methyl-o-aminopentyl)-benzene, 1,3-diamino-4-isopropylbenzene, 4,4-diaminodiphenyl sulfone, 4,4'-diaminodiphenyl ether and bis(3-aminopropyl) tetramethyldisiloxane. Mixtures of these diamines may also be used. Particularly preferred are the aromatic diamines, especially m-phenylenediamine and 4,4'-diaminodiphenylmethane; the R[2] radical is then either

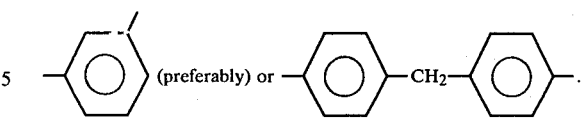

The polyetherimides of this invention may be prepared by reacting at least one diamine of formula X with a mixture of bis-anhydrides of formulas VIII and IV. Various other reagents such as the free carboxylic acids, acyl halides, esters, amides and imides may be substituted for the anhydrides, but the anhydrides are preferred. Since the acid-derived units are combinable in all proportions, the mole ratio of bis-anhydride of formula VIII to that of formula IX is not critical. It is typically between about 20:1 and about 1:20, preferably from about 10:1 to about 1:5 and most often from about 9:1 to about 1:2. The mole ratio of units of formula I to those of formula II in the resulting polymer will, of course, be about the same.

In the reaction, about 0.95–1.05 moles of diamine is usually employed per mole of bis-anhydride. The reaction typically takes place in an aprotic solvent, often an aromatic solvent such as chlorobenzene, o-dichlorobenzene or a mixture of m-cresol and toluene. Because of the limited solubility of sulfone dianhydride in aromatic solvents, however, it is sometimes preferred to use an aliphatic solvent such as dimethylformamide, dimethylacetamide or dimethyl sulfoxide. When such solvents are used, it is frequently advisable to carry out the reaction in two stages in order to minimize the reversibility of the polymerization reaction which can result in decreased molecular weight of the polymer.

In the two-stage process, the first stage is the formation of a polyamic acid and the second stage is the imidization of said polyamic acid. The first stage is typically carried out at a temperature within the range of about 25°–100° C. in an aliphatic solvent such as those enumerated above. In the second state, the polyamic acid is converted to the polyetherimide, typically by heating in the range of about 180°–375° C. Imidization is normally carried out of the absence of solvents, although aromatic solvents such as those enumerated above may be used if desired.

It is also within the scope of the invention to include in the reaction mixture chain stopping agents, typically monofunctional aromatic amines such as aniline or monoanhydrides such as phthalic anhydride.

For the most part, the polyetherimides of this invention have glass transition temperatures in excess of 250° C. and are insoluble in such solvents as chloroform, methylene chloride and o-dichlorobenzene. Thus, they have high thermal stability and solvent resistance. Their weight average molecular weights are typically about 5,000–100,000 and most often about 10,000–50,000; however, the molecular weight is not critical since polyetherimides of any desired molecular weight may be prepared as described herein.

The preparation of polyetherimides of this invention is illustrated by the following examples.

EXAMPLE I

To a solution of 100.9 gms (0.934 mole) of m-phenylenediamine in 2.5 liters of dimethylacetamide in a nitrogen atmosphere was added over 15 minutes, with stirring, a mixture of 243.15 gms (0.467 mole) of bisphenol A dianhydride and 167.24 gms (0.467 mole) of sulfone dianhydride. The solution was stirred for two hours, after which a film thereof was cast on a glass plate and heated for twelve hours at 85° C. The resulting polyamic acid was converted to the desired polyetherimide by heating for 12 hours at 200° C. and for an additional 12 hours at 350° C. The product had a glass transition temperature of 263° C.

EXAMPLE 2

The procedure of Example 1 was followed, using a mixture of 388.54 gms (0.75 mole) of bisphenol A dianhydride and 66.87 gms (0.19 mole) of sulfone dianhydride. A similar product was obtained.

EXAMPLE 3

The procedure of Example 1 was repeated, substituting 4,4'-diaminodiphenyl ether for the m-phenylenediamine on an equimolar basis. The glass transition temperature of the resulting polyetherimide was 263° C.

EXAMPLE 4

The procedure of Example 2 was repeated, substituting 4,4'-diaminodiphenyl ether for the m-phenylenediamine on an equimolar basis. The resulting polyetherimide had a glass transition temperature of 240° C.

The polyetherimides of this invention, as exemplified by the products of Examples 1 and 2, are insoluble in such solvents as methylene chloride, chloroform and o-dichlorobenzene, all of which dissolve the corresponding polyetherimides of bisphenol A dianhydride. Thus, the polyetherimides of this invention have improved solvent resistance. Their improved thermal stability is evidenced by the glass transition temperatures of the products of Examples 3 and 4, as compared with 224° C. for the corresponding polyetherimide of bisphenol A dianhydride.

The polyetherimides of this invention may be used for the formation of films, molding compounds, coatings and the like. Their use is of particular advantage where high heat stability and solvent resistance are desired. Typical areas of utility are in automobile and aviation applications for decorative and protective purposes, as high temperature electrical insulators and dielectrics for capacitors, as coil and cable wrappings, for containers and container linings, in laminating structures for application as films to various heat-resistant or other types of materials, and as filled compositions where the fillers may be asbestos, mica, glass fiber or the like. Other uses include as binders for asbestos fibers, carbon fibers and other fibrous materials in making brake linings, and for formulation of molding compositions using fillers such as asbestos, glass fibers, talc, quartz, wood flour, finely divided carbon and silica. Other uses are similar to those described in U.S. Pat. No. 3,983,093, which is incorporated by reference herein.

What is claimed is:

1. A polyetherimide consisting essentially of chemically combined units having the formulas

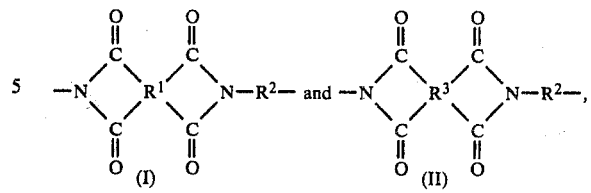

wherein:

$R^1$ is

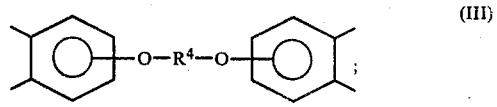

(III)

$R^2$ is an aromatic hydrocarbon radical containing about 6–20 carbon atoms or a halogenated derivative thereof, an alkylene or cycloalkylene radical containing about 2–20 carbon atoms, or a bis-alkylenepoly(dialkylsiloxane) radical;

$R^3$ is

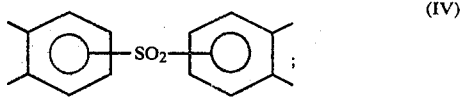

(IV)

and $R^4$ is a divalent radical derived from benzene or a substituted benzene, diphenyl or a substituted diphenyl, or an unsubstituted or substituted diphenylalkane.

2. A polyetherimide according to claim 1 wherein the $-SO_2-$ moiety in formula IV is attached to the aromatic rings in the 4-positions thereof.

3. A polyetherimide according to claim 2 wherein $R^4$ has one of the following formulas:

(V)

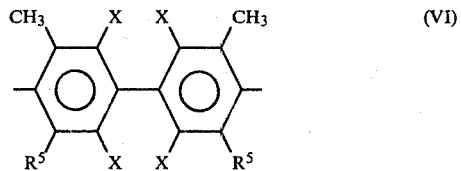

(VI)

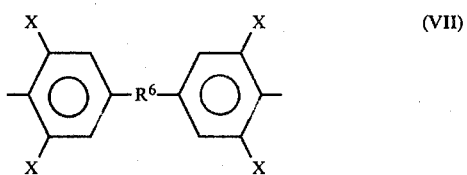

(VII)

wherein each $R^5$ is independently hydrogen or methyl, $R^6$ is a straight-chain or branched alkylene radical containing 1–5 carbon atoms, and each X is independently hydrogen or halogen.

4. A polyetherimide according to claim 3 wherein the mole ratio of units of formula I to those of formula II is between about 20:1 and about 1:20.

5. A polyetherimide according to claim 4 wherein $R^4$ has formula VII, $R^6$ is isopropylidene and each X is hydrogen.

6. A polyetherimide according to claim 5 wherein $R^2$ is an aromatic hydrocarbon radical.

7. A polyetherimide according to claim 6 wherein the $-O-R^4-O-$ moiety in formula III is attached to the aromatic rings in the 4-positions thereof.

8. A polyetherimide according to claim 7 wherein $R^2$ is

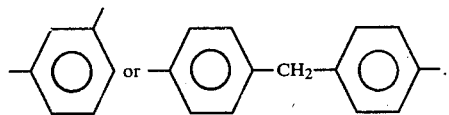

9. A polyetherimide according to claim 8 wherein the mole ratio of units of formula I to those of formula II is between about 9:1 and about 1:2.

10. A polyetherimide according to claim 9 wherein $R^2$ is

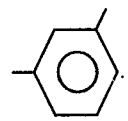

* * * * *